J. & R. BEAN.
Filter.
No. 208,144. Patented Sept. 17, 1878.
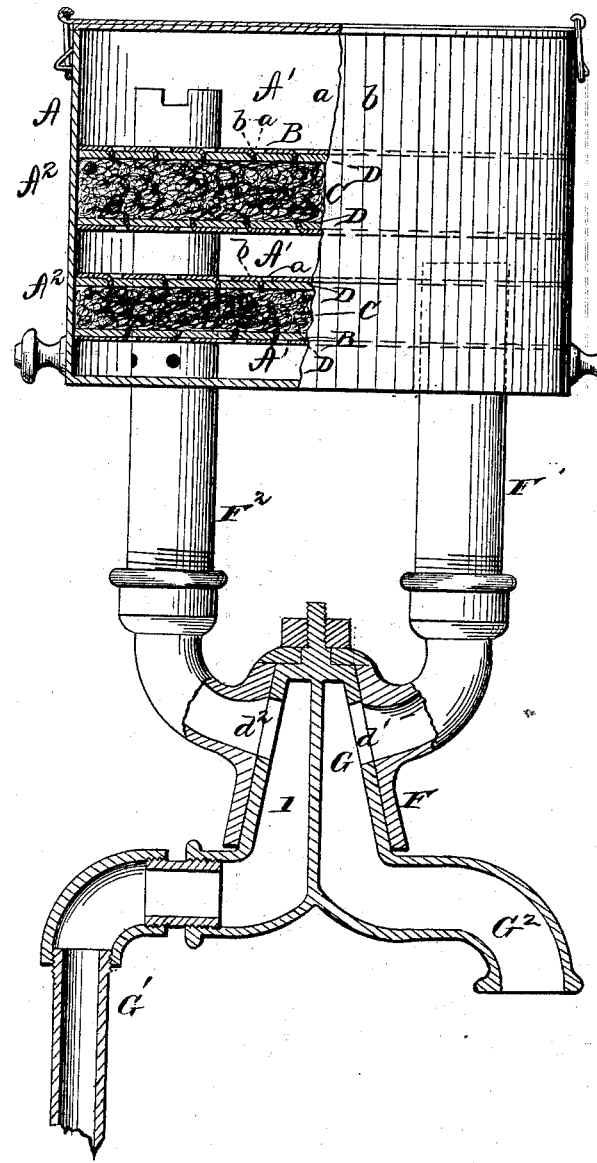

UNITED STATES PATENT OFFICE.

JOHN BEAN AND ROSCOE BEAN, OF HUDSON, MICHIGAN.

IMPROVEMENT IN FILTERS.

Specification forming part of Letters Patent No. 208,144, dated September 17, 1878; application filed July 10, 1878.

*To all whom it may concern:*

Be it known that we, JOHN BEAN and ROSCOE BEAN, of Hudson, in the county of Lenawee, and in the State of Michigan, have invented certain new and useful Improvements in Filters; and do hereby declare that the following is a full, clear, and exact description thereof, reference being had to the accompanying drawing, and to the letters of reference marked thereon, making a part of this specification.

The nature of our invention consists in the construction and arrangement of a reversible filter, as will be hereinafter more fully set forth.

In order to enable others skilled in the art to which our invention appertains to make and use the same, we will now proceed to describe its construction and operation, referring to the annexed drawing, which represents a side elevation, partly in section, of our improved filter.

A represents a case of cylindrical or other suitable form. Within this case are arranged horizontal diaphragms B B, in pairs, to form alternate water-chambers $A^1$ and filtering-chambers $A^2$, as shown. The diaphragms B are formed with numerous perforations, $a$, by punching down the metal from one side of each perforation, the pieces of metal thus punched down forming teeth $b\ b$, as shown.

C represents the filtering material in each filtering-chamber $A^2$, said material being pulverized charcoal, or any other material suitable for the purpose, and between this filtering material and each diaphragm is a layer, D, of felt or any other similar material. This felt is pressed upon the teeth $b$ of the diaphragms, and is thereby held firmly in place, while the filtering material C is prevented by the felt from escaping through the perforations $a$ in the diaphragms.

The filter is designed to move around in either direction, and is connected by two tubes, $F^1$ and $F^2$, with the shell F of a faucet. This shell is made tapering, and fits over a tapering hollow plug, G, which has a central partition, I, with inlet $G^1$ on one side and outlet $G^2$ on the other side. $d^1\ d^2$ are openings in the faucet-plug G, corresponding with the pipes $F^1\ F^2$. The pipe $F^1$ passes up into the water-chamber between the two filtering-chambers, while the pipe $F^2$ passes upward into the top water-chamber, and discharges both into the top and bottom water-chambers, as shown.

When the filter is attached to a hydrant or other supply-pipe, through which the water is forced by pressure, and turned in the manner shown in the drawing, the water passes through the pipe $F^2$ into the first and third water-chambers, through the two filtering-chambers, and out through the pipe $F^1$ and outlet $G^2$. By giving the filter a quarter-turn the apertures $d^1\ d^2$ are closed, and the water is shut off. By continuing the movement of the filter one quarter-turn the course of the water is reversed, and it will ascend through the pipe $F^1$ into the center water-compartment, through both the filtering-chambers, and out through the pipe $F^2$. When the course of the water is thus reversed all the filth and impurities previously collected in the filter will be removed in a very short time, and the water afterward flow pure and filtered. The filter thus by reversing the current becomes self-cleaning, and there is no necessity of taking the filter apart and repacking the same.

Having thus fully described our invention, what we claim as new, and desire to secure by Letters Patent, is—

1. A filter-case provided with interior alternate water-chambers and filtering-chambers, as described, in combination with double pipes connecting the same with the shell or plug of a faucet and moving therewith, substantially as and for the purposes herein set forth.

2. In a filter, the combination, with the case, of the diaphragms B, having perforations $a$ and teeth $b$, the felt layers D D, and intermediate filtering material, C, substantially as and for the purposes set forth.

3. The combination, with the filter-case A and its alternate water and filtering chambers, of the pipes $F^1\ F^2$, faucet-shell F, and plug G, with central partition, I, inlet $G^1$, and outlet $G^2$, substantially as and for the purposes herein set forth.

In testimony that we claim the foregoing we have hereunto set our hands this 12th day of June, 1878.

JOHN BEAN.
ROSCOE BEAN.

Witnesses:
JAMES B. THORN,
SAMUEL EDDY.